United States Patent
Zuo et al.

(10) Patent No.: US 6,935,634 B2
(45) Date of Patent: Aug. 30, 2005

(54) STEAM TURBINE PACKING SPRING

(75) Inventors: Lei Zuo, Cambridge, MA (US); Norman Arnold Turnquist, Carlisle, NY (US); Frederick George Baily, Gallway, NY (US); Mark Edward Burnett, Buskirk, NY (US); Biao Fang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/431,595

(22) Filed: May 8, 2003

(65) Prior Publication Data

US 2004/0222596 A1 Nov. 11, 2004

(51) Int. Cl.⁷ .......................... B60G 11/34; F16F 13/00; F16J 15/40; F16J 15/447
(52) U.S. Cl. ....................... 277/409; 267/160; 267/163; 267/158; 277/416; 277/421
(58) Field of Search ............................... 267/23, 27–29, 267/53, 42, 70–71, 150, 81, 98, 158, 160, 163, 409, 411–413, 416, 421

(56) References Cited

U.S. PATENT DOCUMENTS

| 3,880,321 A | * | 4/1975 | Braginetz ................... 221/66 |
| 4,103,905 A | * | 8/1978 | Desmond et al. ........... 277/413 |
| 4,420,161 A | | 12/1983 | Miller |
| 5,002,288 A | | 3/1991 | Morrison et al. |
| 5,106,586 A | * | 4/1992 | Muszak et al. ............... 422/99 |
| 5,181,308 A | * | 1/1993 | Gray et al. .................... 29/436 |
| 5,374,068 A | | 12/1994 | Jewett et al. |
| 5,503,405 A | | 4/1996 | Jewett et al. |
| 5,509,780 A | | 4/1996 | Synfelt |
| 5,709,388 A | | 1/1998 | Skinner et al. |
| 6,022,027 A | | 2/2000 | Chevrette et al. |
| 6,065,754 A | | 5/2000 | Cromer et al. |
| 6,250,641 B1 | * | 6/2001 | Dinc et al. .................. 277/355 |
| 6,394,459 B1 | | 5/2002 | Florin |
| 6,669,203 B1 | * | 12/2003 | Mortzheim .................. 277/355 |

OTHER PUBLICATIONS

1 Page having two clips on Pens.*

* cited by examiner

Primary Examiner—Heather Shackelford
Assistant Examiner—Vishal Patel
(74) Attorney, Agent, or Firm—Nixon & Vanderhye P.C.

(57) ABSTRACT

A packing spring for a steam turbine comprising a flat, elongated spring body of specified length, width and thickness dimensions; a flange at one end of the main spring body; and at least one bend in the main spring body, located substantially midway along the length dimension of the spring body.

12 Claims, 3 Drawing Sheets

STEAM TURBINE PACKING SPRING

This invention relates to seals used in steam turbines and, specifically, to a spring configuration for a packing seal used between a stationary turbine component and the turbine rotor.

BACKGROUND OF THE INVENTION

Turbomachines use numerous sealing techniques to establish seals between stationary and rotating parts of the turbine. In some instances, the seals are designed to provide radial movement away from the rotating components to prevent rubs during operation. In other instances, the springs bias the seal segments toward the rotor, while fluid pressure applied during operation counters the spring force so as to move the seal teeth out of engagement with, but in close proximity to the rotating component to achieve the desired sealing function.

In steam turbines, for example, it is customary to employ a plurality of arcuate seal ring segments to form a labyrinth seal about and between the stationary and rotating components. Typically, the arcuate seal ring segments are disposed in an annular groove in the stationary component (or casing), and are designed to be concentric about the axis of rotation of the machine and hence concentric to the sealing surface of the rotating component. Each arcuate seal segment carries an arcuate seal face in opposition to the sealing surface of the rotating component. The seal faces typically carry a radially-directed array of axially spaced teeth that are radially spaced from an array of axially spaced annular grooves forming the sealing surfaces of the rotating component. Alternatively, the rotating component may have a smooth surface in radial opposition to the array of teeth on the seal faces. In any event, the sealing function is achieved by creating turbulent flow of a working media, for example, steam, as it passes through the relatively tight clearances within the labyrinth defined by the seal face teeth and the opposing surface(s) of the rotating component.

The annular groove in the stationary component is generally dovetail-shaped, having locating flanges directed axially toward one another and defining a slot therebetween. The stationary component is split lengthwise such that the semi-annular dovetail grooves may receive correspondingly-shaped arcuate seal ring segments. More particularly, the arcuate segments are similarly dovetail-shaped with a pair of flanges directed axially away from one another for disposition within the dovetail groove, with a narrow neck joining the seal face and the flanges of the segment and passing through the slot defined by the locating flanges of the grooves. The neck carries the arcuate seal face radially inwardly of the groove when installed, i.e., the arcuate seal face is radially adjacent the rotor.

Many designs utilize springs to return and hold the seals against a stop to a designed radial clearance. While numerous spring designs have been used over the years, each has significant disadvantages. For example, flat springs used with turbine packing seals require a large amount of radial space behind the packing ring to meet spring loads and to avoid overstressing the spring during large displacements. Another disadvantage is the fact that each packing ring segment is contacted in only one location, i.e., at the mid point of the seal segment. In this condition, the packing segment can rotate about that pivot point with relatively small input forces. If a cyclic force were applied to the packing ring, it would be possible to create a vibratory mode which could lead to high cycle fatigue of the packing ring and/or spring. Finally, the current flat spring design allows for the application of a single spring constant only.

An alternative approach to flat springs is the use of coil springs applied at two or more locations in each segment. Coil springs decrease the amount of free space behind each packing segment to a minimum, equal to the desired segment travel, and prevent pivoting about the spring contact points, since each segment is supported at multiple points. However, the coil spring design requires multiple cylindrical pockets milled into the back of each seal segment. These milled pockets may interfere with other hardware that may be installed into the segment. In addition, variable spring rates are not easy to attain without nesting multiple coil springs. It may be desirable to control the spring rate, but that may unload one of the nested springs, allowing it to vibrate and become damaged.

BRIEF DESCRIPTION OF THE INVENTION

This invention provides additional space in the existing or new seal location. This space can be used to include additional devices or added material for reducing stress and increasing product life. The invention also provides a seal support that prevents pivoting about the support point, thus reducing the risk of high cycle fatigue or improper seal operation, and also permits a spring rate that may vary throughout the stroke of the seal.

The spring configuration in accordance with this invention is similar to a flat or leaf spring design, but contains either a simple single or compound bend near the center of the spring length. This configuration alters the support points of the seal, thus resisting pivoting of the segment about the traditional single contact point near the center of the seal. It also reduces the amount of radial space required by the spring, and permits compound spring constants which may be tuned to meet design requirements.

Thus, in one aspect, the invention relates to a packing spring for a steam turbine comprising a flat, elongated spring body of specified length, width and thickness dimensions; a flange at one end of the main spring body; and at least one bend in the main spring body, located substantially midway along the length dimension of the spring body.

In another aspect, the invention relates to a seal ring and packing ring assembly comprising at least one arcuate seal ring segment located in a stationary turbine casing, and at least one spring located radially between the casing and the seal ring segment, the at least one spring comprising a flat, elongated spring body of specified length, width and thickness dimensions; a locating flange at one end of the spring body; and at least one bend in the spring body, located substantially midway along the length dimension of the spring body.

The invention will now be described in detail in connection with the drawings identified below.

DETAILED DESCRIPTION OF THE INVENTION

Figure 1:
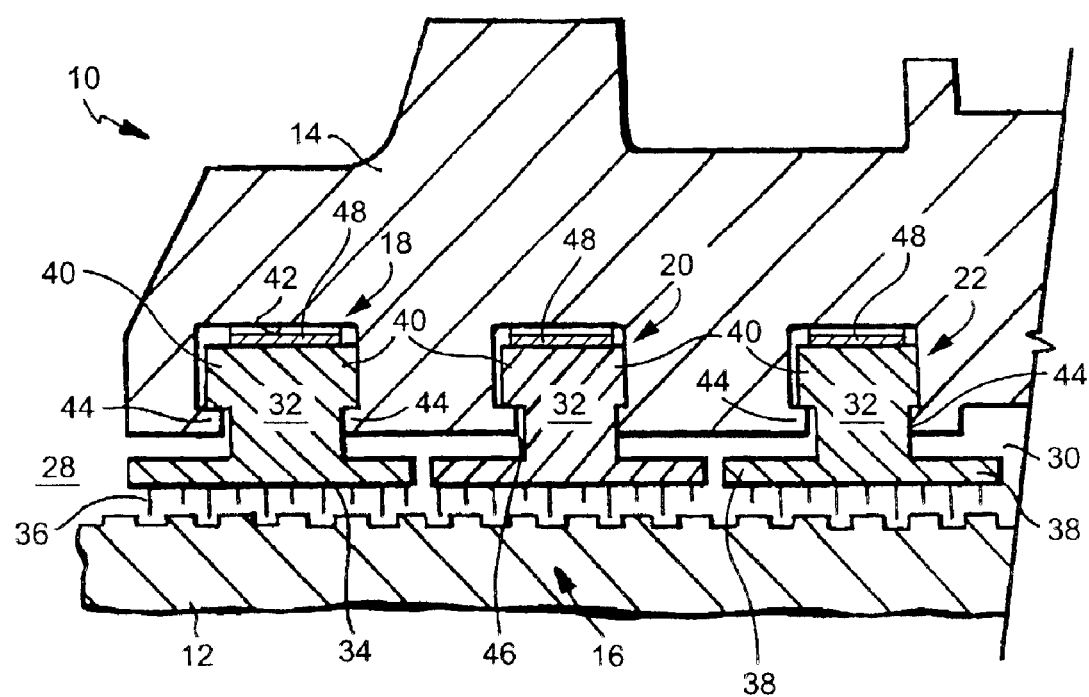
FIG. 1 is a fragmentary cross-sectional view of a portion of a steam turbine looking transversely of the axis thereof and illustrating a known labyrinth seal arrangement.

Referring now to FIG. 1, there is illustrated a portion of a steam turbine, generally designated 10, including a turbine rotor or shaft 12, disposed in a turbine housing 14. The shaft 12 is supported for rotation by conventional means, not shown, within the turbine housing. A multiple-stage labyrinth seal 16 includes a plurality of seal rings 18, 20 and 22 disposed about the turbine shaft 12 separating high and low pressure regions 28 and 30, respectively. Each seal ring is formed of an annular array of a plurality of arcuate seal segments 32. In general, the labyrinth seal 16 functions by placing a relatively large number of partial barriers to the flow of steam from the high pressure region 28 to the low pressure region 30. Each barrier forces steam, attempting to flow parallel to the axis of turbine shaft 12, to follow a tortuous path whereby a pressure drop is created. The sum of all the pressure drops in the labyrinth seal 16 is, by definition, the pressure difference between the high and low pressure regions 28 and 30.

The arcuate seal ring segments 32 have sealing faces 34 and radial projecting teeth 36, each sealing face 34 being formed by a pair of flanges 38 extending axially away from one another. The radially outer portions of the seal ring segments 32 include locating flanges or hooks 40 which also extend axially away from each other and the segment 32 in opposite directions. As illustrated in FIG. 1, the turbine housing 14 has a generally dovetail-shaped annular groove 42 defined along its radially innermost portions by a pair of locating flanges 44 which extend axially toward one another defining a slot 46 therebetween. Flat springs 48 are located between the segments 32 of seal rings 18, 20 22 and housing 14 and serve to bias the segments 32 radially inwardly toward the rotor 12.

Figure 2:
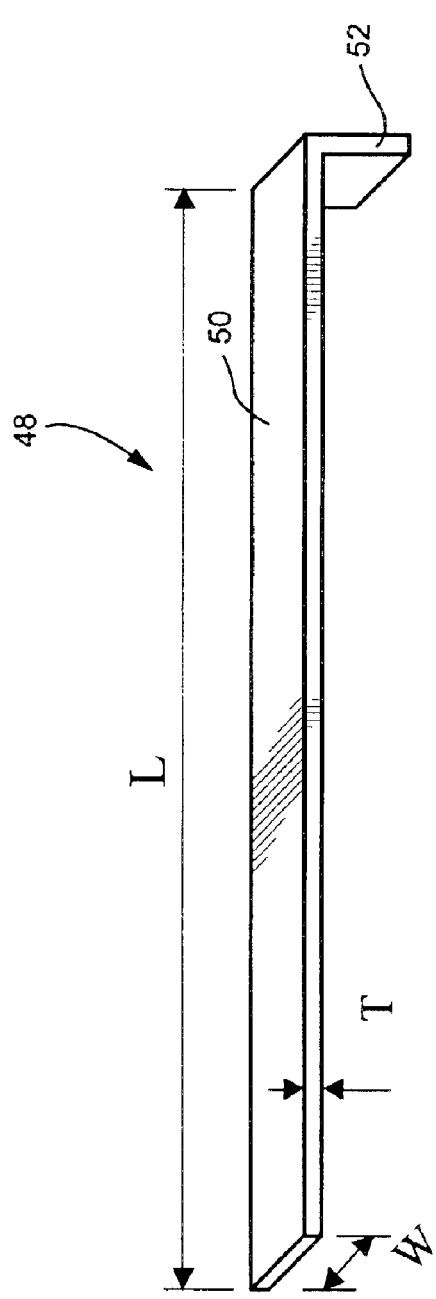
FIG. 2 shows a conventional flat seal spring of length L, width W and thickness T.

FIG. 2 illustrates a conventional flat spring 48 of specified length L and width W, with a main spring body 50 and a locating flange 52 at one end thereof. The flange extends away from the body 50 at an angle of 90° relative to the body 50.

Figure 3:
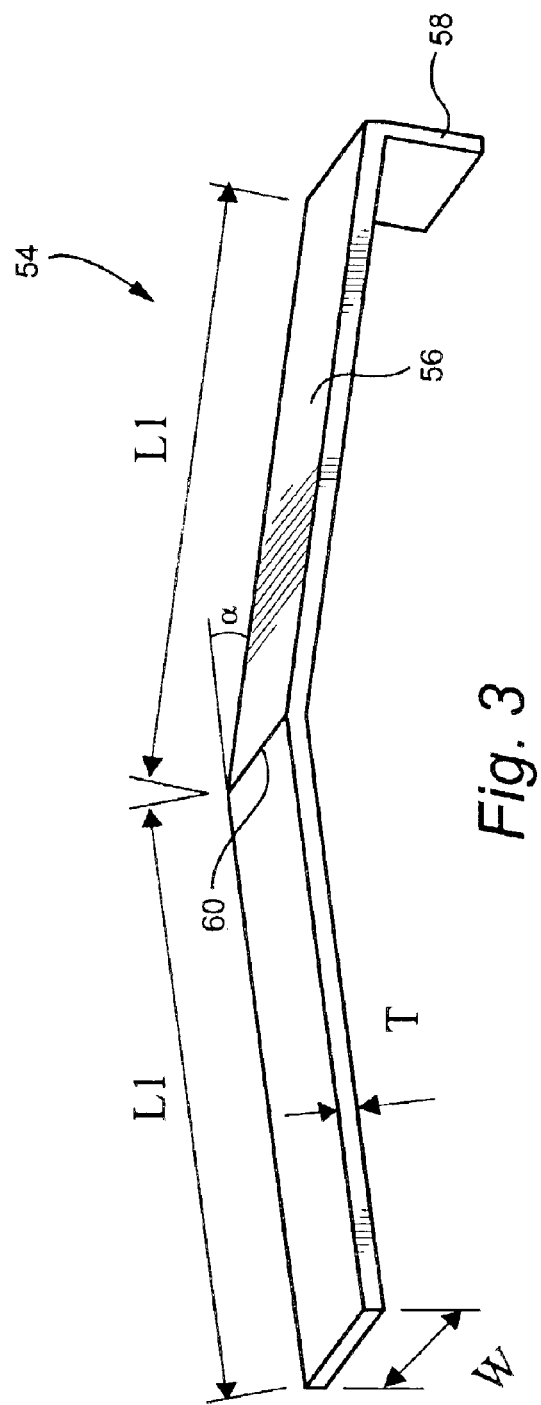
FIG. 3 shows a simple angled seal spring in accordance with the invention with spring lengths L, Width W, thickness T, and a center bend at an angle $\alpha$.

FIG. 3 illustrates a spring 54 in accordance with an exemplary embodiment of this invention. The spring 54 (made of Inconel X-750 or other suitable metal/alloy) has a length equal to L1+L1 and a width W. The spring 54 also includes a main spring body 56 and a locating flange 58 at one end thereof. In this design, however, there is a simple, single bend 60 near the center of the length of the main spring body 56. It will be understood that the bend may also be of a compound nature. In one example, the spring has a length ($L_1 + L_1$) of 12 inches, a width W of 1½ inches and a thickness T of about ⅛ inch. The bend angle α is about 11°. It will be appreciated that the dimensions may vary depending primarily on the diameter of the seal. The spring length may thus vary between about 6 inches and about 18 inches, and the bend angle may vary between about 5°–15°.

Figure 4:
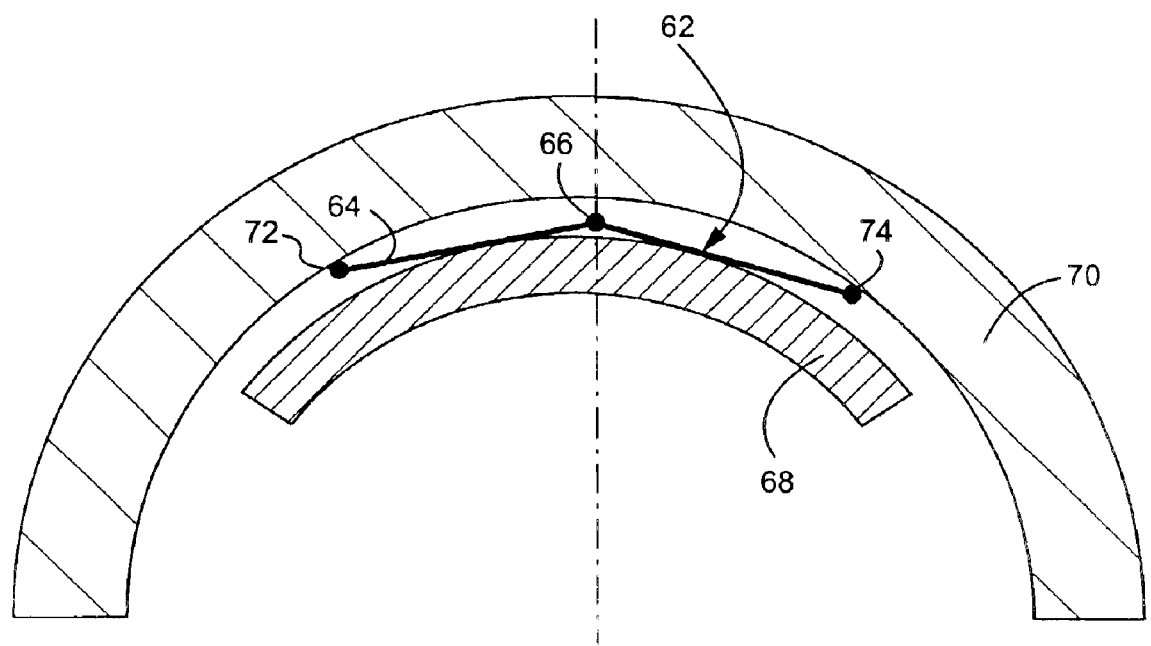
FIG. 4 is a simplified schematic showing one support arrangement for the spring shown in FIG. 3.
Figure 5:
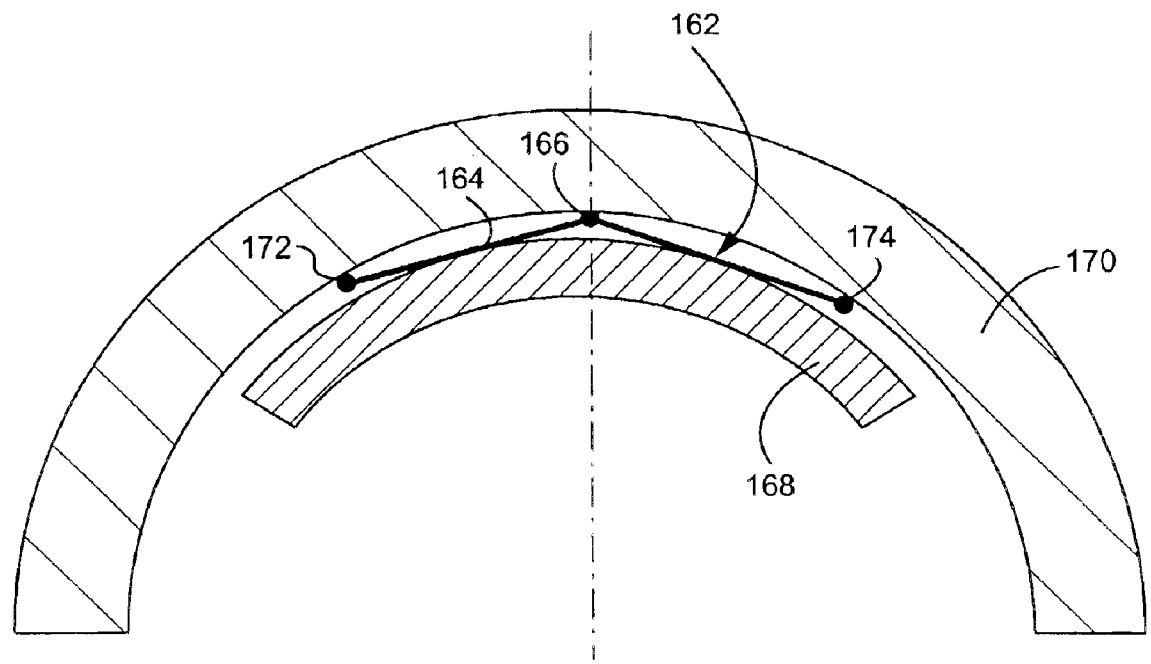
FIG. 5 is a simplified schematic similar to FIG. 4 but showing another support arrangement.

Significantly, the new design changes the support points vis-a-vis the seal, as best seen in FIGS. 4 and 5. These are simplified representations of the various components for the sake of clarity and ease of understanding. FIG. 4 illustrates one arrangement where a spring 62 in accordance with the invention includes a spring body 64 formed with a center bend 66. The spring is located radially between a seal segment 68 and a stationary turbine component or casing 70. The locating flange (see 58 in FIG. 3) has been omitted. In this arrangement, the spring is supported by the casing 70 at the opposite ends 72, 74 of the spring, and contacts the segment 68 at a pair of locations midway between the opposite ends 72, 74 and the center bend 66. Note that no contact is made at the center bend. This arrangement resists any potential pivoting motion of the seal segment 68 that might otherwise occur with a single point of contact at the center of the seal as with prior spring designs.

FIG. 5 illustrates a variation where similar reference numerals but with the prefix "1" added, are used to designate corresponding components. Thus, spring 162 is located radially between seal segment 168 and casing 170. The spring has a main body 164 and, again, the locating flange has been omitted. As in the case of FIG. 4, the opposite ends engage the casing 170, and the spring body 164 engages the seal segment 168 at locations midway between the opposite ends 172, 174 and center bend 166. In this case, however, the design is such that the center bend 166 of the spring also engages the casing 170. In other words, the spring 162 "bottoms out" against the casing 170 at the center bend 166 when the seal segment 168 moves to its radially outermost position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A packing spring for biasing an arcuate seal ring segment radially inwardly toward a rotor of a steam turbine, said packing spring consisting of: a flat, elongated spring body of specified length, width and thickness dimensions, a flange at one end of said main spring body and a bend in said spring body located substantially midway along the length dimension of said spring body such that one portion of said spring body is bent at an angle of between about 5 and 15° relative to an adjacent portion of said spring body, wherein said one end and an opposite end of said spring body are adapted to engage a stationary casing of said steam turbine and portions of said spring body between said ends and said bend are adapted to engage said seal ring segment so as to bias the spring seal segment in a radial direction.

2. The packing ring of claim 1 wherein said length dimension is between about 6 inches and about 18 inches.

3. The packing ring of claim 1 wherein said width is about 1½ inches.

4. The packing ring of claim 1 wherein said thickness is about ⅛ inches.

5. The packing ring of claim 1, wherein said bend angle is about 11°, and said length is about 12 inches.

6. A turbine casing in combination with a seal ring and packing ring assembly for a steam turbine comprising at least one arcuate seal ring segment located in the turbine casing, and at least one spring located radially between said casing and said seal ring segment, said at least one spring comprising a flat, elongated spring body of specified length, width and thickness dimensions; a locating flange at one end of said spring body; and at least one bend in said spring body, located substantially midway along the length dimension of said spring body, wherein said one end and an opposite end of said spring body are engaged with said turbine casing and portions of said spring body between said ends and said bend are engaged with said seal ring segment so as to bias said seal ring segment in a radially inward direction, toward a rotor of said steam turbine.

7. The combination of claim 6 wherein said bend is at an angle of between about 5 and 15°.

8. The combination of claim 6, wherein said length dimension is between about 6 inches and about 18 inches.

9. The combination of claim 6 wherein said width is about 1½ inches.

10. The combination of claim 6 wherein said thickness is about ⅛ inch.

11. The combination of claim 7 wherein said bend angle is about 11°, and said length is about 12 inches.

12. The combination of claim 6 wherein when said seal ring segment is in a radially outermost position, said at least one bend is also engaged with said turbine casing.

* * * * *